US009624963B2

(12) United States Patent
Shi

(10) Patent No.: US 9,624,963 B2
(45) Date of Patent: Apr. 18, 2017

(54) VACUUM SUCTION CUP HAVING BOWL-SHAPED FRAMEWORK

(71) Applicant: ZHONGSHAN TAILI HOUSEHOLD PRODUCTS MANUFACTURING CO., LTD., Zhongshan (CN)

(72) Inventor: Zhengbing Shi, Zhongshan (CN)

(73) Assignee: ZHONGSHAN TAILI HOUSEHOLD PRODUCTS MANUFACTURING CO., LTD., Zhongshan ( * ) Notice: Subject to any disclaimer, the term of this patent is extended or adjusted under 35 U.S.C. 154(b) by 0 days.

(21) Appl. No.: 14/442,726

(22) PCT Filed: Nov. 9, 2013

(86) PCT No.: PCT/CN2013/087436
§ 371 (c)(1),
(2) Date: May 14, 2015

(87) PCT Pub. No.: WO2014/075643
PCT Pub. Date: May 22, 2014

(65) Prior Publication Data
US 2015/0330438 A1   Nov. 19, 2015

(30) Foreign Application Priority Data

| Nov. 19, 2012 | (CN) | 2012 2 0613987 |
| Mar. 8, 2013 | (CN) | 2013 2 0107296 |
| Mar. 8, 2013 | (CN) | 2013 2 0107297 |
| Mar. 8, 2013 | (CN) | 2013 2 0108046 |
| Sep. 6, 2013 | (CN) | 2013 1 0404140 |
| Sep. 6, 2013 | (CN) | 2013 1 0405292 |
| Sep. 6, 2013 | (CN) | 2013 2 0554911 |

(51) Int. Cl.
| A45D 42/14 | (2006.01) |
| F16B 47/00 | (2006.01) |
| F16M 13/02 | (2006.01) |
| A47K 10/14 | (2006.01) |

(52) U.S. Cl.
CPC .............. *F16B 47/00* (2013.01); *A47K 10/14* (2013.01); *F16B 47/006* (2013.01); *F16M 13/022* (2013.01); *A47K 2201/02* (2013.01)

(58) Field of Classification Search
CPC ..... F16B 47/00; F16B 47/006; F16M 13/022; B60R 2011/0056; B60R 2011/0068
USPC ........................................... 248/205.5, 205.8
See application file for complete search history.

(56) References Cited

U.S. PATENT DOCUMENTS

| 5,104,077 A * | 4/1992 | Liu .................. F16B 47/00 248/205.8 |
| 6,308,923 B1 * | 10/2001 | Howard ............. F16B 47/00 248/205.5 |
| 6,932,306 B2 * | 8/2005 | Zou .................. F16B 47/00 248/205.5 |

* cited by examiner

*Primary Examiner* — Todd M Epps
(74) *Attorney, Agent, or Firm* — Bei & Ocean; George G. Wang

(57) ABSTRACT

A suction cup, including a bowl-shaped framework, a cup body covering the framework, a connecting rod on a back surface of the framework and passing through the cup body, a bowl-shaped cup cover placed on the connection rod and covering the back surface of the cup body, and an annular protruding rib placed on the periphery of the back surface of the framework, which is in direct contact with the inner surface of the cup cover for effectively transfer the pressing force to make the suction cup less likely to fall off from the supporting surface.

20 Claims, 7 Drawing Sheets

VACUUM SUCTION CUP HAVING BOWL-SHAPED FRAMEWORK

FIELD OF THE INVENTION

This invention relates to a type of suction cup for civilian use, in particular a type of suction cup with bowl-shaped framework.

BACKGROUND OF THE INVENTION

Suction cups for civilian use are mainly for people to hang articles on a supporting surface such as walls. As it can be relocated to any positions at will, it can be conveniently used to hang towels, clothing articles, etc. Such suction cup is easy to use and can maintain attachment via vacuum assisted by adhesion, without drilling on the wall, it has therefore been widely used.

Existing suction cups may be made with or without a framework. Traditional suction cup without a framework is normally made of soft plastic integrally formed by injection molding. However, such suction cup cannot fully discharge air between the cup's adsorption surface and the supporting surface, and air may easily seep in via the edge of the adsorption surface, the adsorptive force is thus reduced and insufficient. The suction cup without a framework developed subsequently mainly consists of a fixing handle, a cup body, a cup cover placed on the cup body, a connecting rod provided at the center of the cup body, penetrating the cup cover and connecting to the fixing handle, and a spring loaded on the connecting rod. A force applied on the fixing handle pulls up the cup body via the connecting rod, so that vacuum (negative pressure) is generated between the cup body and the wall surface, thereby holding the suction cup onto the wall surface. However, this type of suction cup has a complicated structure and high production cost, it is not easy to operate, and its adsorptive force is not strong.

For conventional suction cups with a framework, the framework can transfer the pressing force very well, adsorptive force is thus greatly increased. Therefore, structural improvement of the suction cup with a framework has become the trend of R & D efforts of the industry.

At present, a conventional suction cup with a flat framework normally consists of a framework, a suction cup body covering the framework, a connecting rod on the back of the framework, a cup cover which is on the connecting rod and covers the back of the cup body, and a hanging hook provided on the back of the cup cover and connected to the connecting rod for pressing and pulling the framework. When fixing such suction cup on the wall surface, first put the suction cup on the wall surface, and then apply an external force to pull up the connecting rod and deform the framework (from the original flat form), creating a vacuum cavity between the suction cup body and the wall surface. At the same time, under the action of the external force, the cup cover transfers the force for counteracting on the cup body, limiting its deformation, preventing the external air from entering the vacuum cavity. Under such mutual counteraction, the cup body is sucked to the wall surface. The term "wall surface" means any supporting surfaces for hanging articles.

However, the adsorptive force of existing suction cup with a flat framework is not large enough, so that the suction cup may easily fall off from the wall surface, in particular when conditions of the wall surface are not ideal (for example, the wall surface is too smooth or has sags and crests), the friction force between the suction cup and the wall surface is too small, resulting in falling off of the suction cup. Thus, it cannot meet the need in terms of handing capacity and durability.

SUMMARY OF THE INVENTION

An object of this invention is to provide a type of suction cup with a bowl-shaped framework that can effectively transfer pressing forces, which does not easily fall off from the supporting surface.

This object is realized by the following technical measures: a suction cup with a bowl-shaped framework, comprising a bowl-shaped framework, a cup body covering the framework, a connecting rod provided on the back surface of the framework and passing through the cup body, a cup cover disposed on the connecting rod and covering the back surface of the cup body, and a hooking device provided on the back surface of the cup cover and connected to the connecting rod; wherein an annular protruding rib is provided on the edge of the back surface of the framework and inner surface of the cup cover is in contact with the annular protruding rib.

In the invention, the cup cover directly in contact with the annular protruding rib, so that the pressing force is transferred via the rib, causing an overall deformation of the cup, sucking the air from between the cup body and the supporting surface to form a vacuum cavity. After the external force is removed, the internal residual forces of the framework and the cup cover would urge the cup body to restore to its original natural state, but such restoration tendency is limited by the air tightness between the cup body and the supporting surface and the cup body is kept closely pressed against the supporting surface. The protruding rib can effectively transfer the external pressing force so that the cup will not fall off easily from the supporting surface.

In the invention, a protruding ring is provided on the back surface of the cup body for wrapping around the annular protruding rib, and the inner surface of the cup cover presses against the annular protruding rib via the protruding ring. Since the protruding rib is wrapped around by the protruding ring, it will not break or be damaged easily when it is pressed by the cup cover, and can continuously and effectively transfer the pressing force.

On the cup cover, a number of deformation holes are provided and distributed in a circular formation in a central location in the cup cover, which provides space for elastic deformation when the cup cover is subject to an external pressing force; otherwise the cup cover would have little room to deform and may even break. Compared with the suction cup without the deformation holes, it requires a much reduced external pressing force to operate. Preferably, such deformation holes are elongated rectangular openings in the radial orientation, or they can be arch-shaped openings along a circular line.

As an improvement of the invention, a plurality of through holes are provided in the back surface of the cup body, which allow the annular protruding rib of the framework to pass through and be exposed on the back surface of the cup body. In this way, the inner surface of the cup cover directly in contact with the annular protruding rib. On the framework, elongated cuts or notches in the radial orientation along its circumference are provided, truncating the annular protruding rib, so that the rib comprises a number of bulges positioned in a circle, which receive the pressing force from the cup cover, deforming the framework via the radial cuts.

In the invention, the radial cuts are provided to allow deformation of the framework when being pressed. Besides, these cuts also facilitate running of molding materials during a secondary injection in forming the cup, and facilitate a full wrapping of the framework by the soft materials, making it an integral part of the cup body. Further, the individual fragments formed by the radial cuts can perform the "grasping" action, similar to the fingers of a human palm. In particular, on uneven, coarse, dense, and airtight supporting surfaces, each single fragment can be adsorbed to a position of different heights on the actual supporting surface, realizing automatic adjustment of to the unevenness of the surface so that a stronger adsorptive force, as well as a stronger friction force, is generated when the adsorption surface of the cup body is in contact with the supporting surface. Therefore, the suction cup of the present invention can be better adaptable to uneven, coarse, dense, and airtight supporting surfaces.

As a further improvement of the invention, the cuts include short cuts and long cuts, wherein the long cuts extend from a position near the framework's center to its edge, and the short cuts have a length of ⅓-¾ of that of the Long Cuts; Wherein the Short and long cuts are arranged alternately to form a number of Y-shaped forks, with a bulge located at both opening ends of such Y-shaped fork. Alternate arrangement of short and long cuts of the invention can ensure the strength of each Y-shaped fork, to make up the insufficient strength of each individual fragment and avoid any decreasing in the adsorptive force due to the presence of the cuts.

The present invention can also be improved as follows: seals are provided on the adsorption surface of the cup body, extending out of the adsorption surface and forming a contact friction surface between the seal and the edge of the cup body. These seals further enhance the sealing performance of the vacuum cavity, increasing the adsorptive force of the cup, while also forming a friction surface.

In the invention, the bonding affinity of the seals is higher than that of the cup body, so that seals are more easily attached to the supporting surface, enhancing the sealing effect. Besides, the bonding between seals and the cup body is good, so that the seals are not easily separated from the cup body.

In the invention, the cup body and the seals may be formed as an integral part. As an embodiment of the invention, installation grooves may be provided on the adsorption surface of the cup body, with the seals being installed inside and extending out of the opening of the grooves.

As another embodiment of the invention, the seals are one or more sealing gasket or seal rings; wherein the annular grooves of different sizes are concentrically arranged around the center of the cup body's adsorption surface, each with a corresponding a seeling ring and a contact friction surface formed between the largest seal ring and the edge of the cup body. If only one seal ring is used, it offers the advantages of reduced cost and production complicity while still provides a good airtightness.

As a further embodiment of the invention, one sealing gasket and at least one seal ring are used as the seals, wherein the sealing gasket is located close to the center of the cup body's adsorption surface and an annular groove is provided for installation of each seal ring and if more than one seal ring are used, they are arranged concentrically around the sealing gasket, and a contact friction surface is formed between the largest seal ring and the edge of the cup body.

As an improvement of the invention, an annular coarse area is provided near the edge of the cup body's adsorption surface, with a smooth area provided between the coarse area and the edge of the adsorption surface, and corresponds to the protruding ring of the framework. The annular coarse area can increase the friction force between the adsorption surface and the supporting surface, to further enhance the adsorptive force of the cup so that it will not fall easily.

As an embodiment of the invention, the annular coarse area is a fully enclosed ring-shaped area.

As another embodiment of the invention, the annular coarse area consists of a number of coarse strips on a circumference, with a smooth strip provided between two adjacent coarse strips.

Preferably, the coarse surface of the coarse ring and coarse strips are formed by eroded veins or net veins.

In the invention, reinforcing bars may be provided at the place where the connecting rod connects the framework.

To further enhance adsorptive force of the cup, the following improvement can also be made to the present invention:

One pressing element is added on the back surface of the cup cover, which is a nut sleeve. The connecting rod is a screw rod and the hook is disposed on the screw rod between the back surface of the cup cover and the nut sleeve. After the cup body is placed onto the supporting surface, the nut sleeve can be rotated down to pull up the screw rod and hence the adsorption surface of the cup body, further increasing the degree of vacuum in the vacuum cavity.

On the back surface of the cup cover, a locating hole is provided. On the hook a locating column corresponding to the locating hole is provided so that the column can be inserted in the locating hole to fix the hook on the cup cover.

The hook is hinged to the connecting rod. The connecting end of the hook is cam-shaped. After the cup body is placed to the supporting surface, the cam's protruding part of the connecting end can be pressed against the back surface of the cup cover, pulling up the connecting rod and hence the adsorption surface of the cup body, increasing the degree of vacuum in the vacuum cavity.

As an embodiment of the invention, the hook is connected to the connecting rod via a buckle.

To further enhance the airtightness effect of the cup and increase the contact area and the adsorptive force, the circumferential edge of the cup body may include a lip rim extending outward, which is of a thin sheet form.

The present invention has the following advantages over the prior art:

(1) In the present invention, when the suction cup is pressed, the protruding rib can effectively transfer the pressing force, so that the suction cup will be less likely to fall off from the supporting wall.

(2) The protruding rib is wrapped around by a protruding ring, so that when pressed by the cup cover, the rib is less likely to be broken or otherwise damaged, and can continuously and effectively transfer the pressing force.

(3) In the invention, radial cuts are used to deform the framework when pressed, and to facilitate the running of molding materials during a secondary injection in forming the cup and hence the fully wrapping of the framework by the soft material, make the framework an integral part of the cup body. Furthermore, the individual fragments formed due to the radial cuts can perform the "grasping" act, similar to the fingers of the human palm. In particular, on uneven, coarse, dense, and airtight supporting surfaces, each of the fragments can be adsorbed to an area with different characteristics, such as height, of the actual supporting surface, realizing automatic adaption to an uneven supporting surface. Therefore, the suction cup of the present invention are particularly suitable for uses on uneven, coarse, dense, and airtight supporting surfaces.

(4) Alternate arrangement of short and long cuts of the framework can ensure the strength of each Y-shaped fork to overcome insufficient strength provided by small individual fragments due to the presence of the cuts.

(5) The seals can further enhance sealing effect of the vacuum cavity, increasing adsorptive force of the suction cup as well as forming a friction surface between seals and edge of cup body, thus ensuring a sufficient vacuum adsorptive force and friction force.

(6) The annular coarse area can increase the friction force between the adsorption surface and the supporting surface, to further enhance the adsorptive force of the cup, so that it will be less likely to fall off from the supporting surface.

(7) A pressing element is added on the back surface of the cup cover to assist the connecting rod in pulling up the adsorption surface of the cup body and increasing the degree of vacuum in the vacuum cavity, further enhancing the adsorptive force of the cup.

(8) Lip rims can be used to further enhance the airtightness of the vacuum cavity between the cup body and the supporting surface, and increase the contact area size and the adsorptive force.

BRIEF DESCRIPTION OF THE DRAWINGS

The following further describes this invention in detail in combination with the figures below.

DETAILED DESCRIPTION OF PARTICULAR EMBODIMENTS OF THE INVENTION

Embodiment 1

Figure 1:
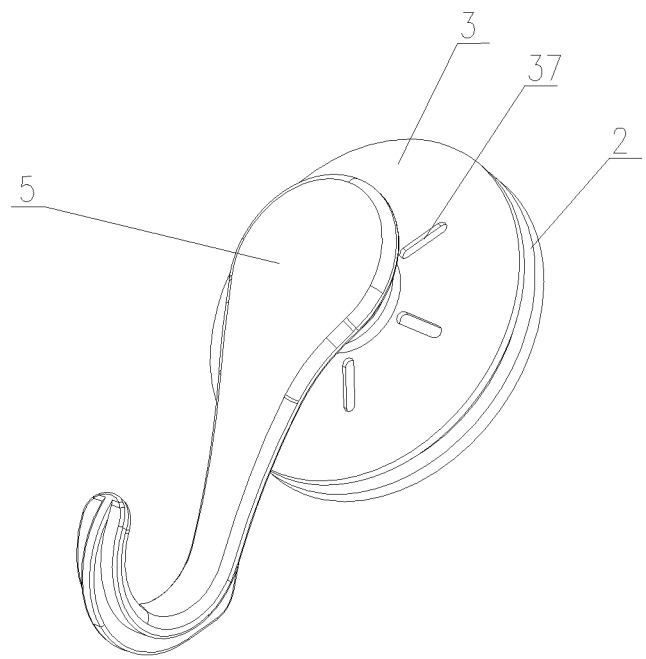
FIG. 1 is an overall structural diagram of embodiment 1 of the invention.
Figure 2:
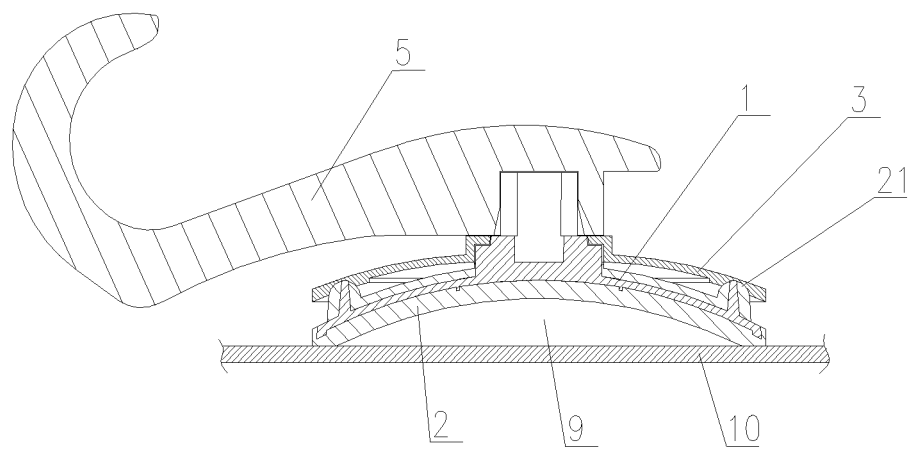
FIG. 2 is an overall section view of embodiment 1.
Figure 3:
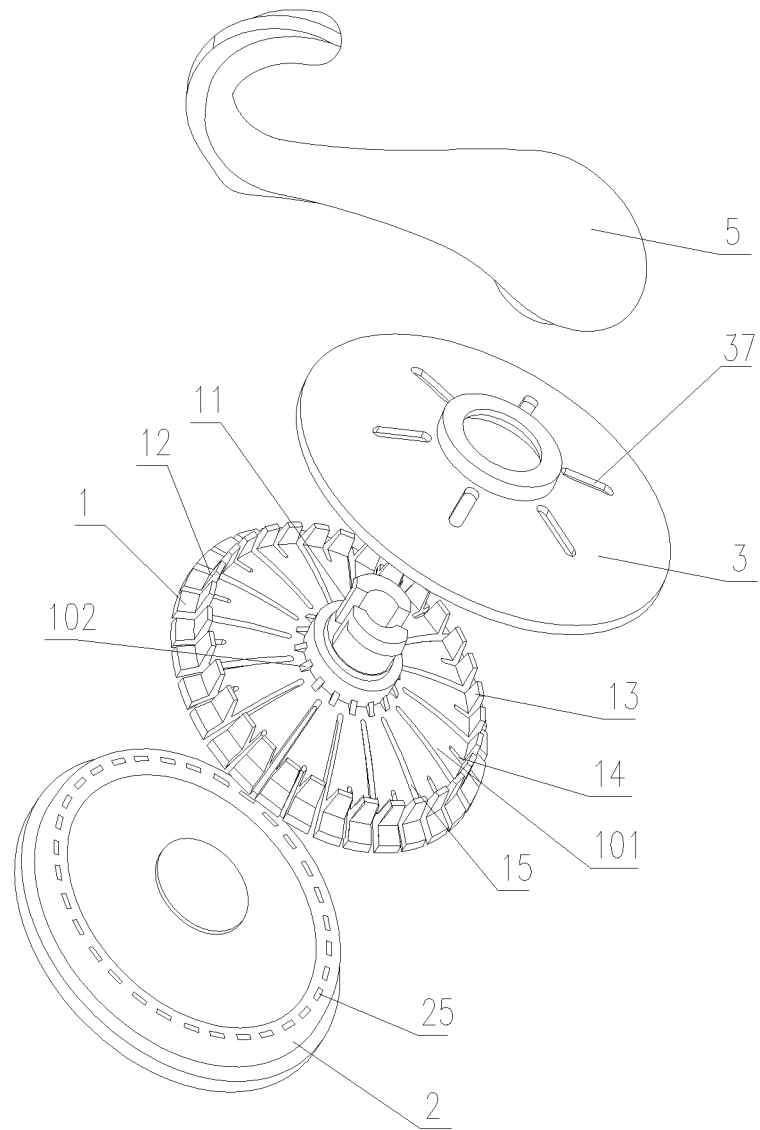
FIG. 3 is a structural exploded view of embodiment 1.

As shown in FIG. 1-FIG. 3, the invention discloses a type of suction cup with a bowl-shaped framework, comprising bowl-shaped framework 1 which is deformable, cup body 2 wrapping up the framework, connecting rod 11 disposed on the back surface of the framework and passing through the cup body, bowl-shaped cup cover 3 disposed on the connecting rod and covering the back surface of the cup body, and a hooking element provided on the back surface of the cup cover and connected to the connecting rod; wherein (in a preferred embodiment) the hooking element is hook 5, connected to the connecting rod via a buckle. The framework has the shape of a disk and at its circumferential edge and on the back surface, annular protruding rib 12 is provided with an optimum height about 2-4 mm. Corresponding to the position of the annular protruding rib, through holes 25 are provided on the back surface of the cup body, which allow extending of the annular protruding rib to pass through and exposed on the back surface of the cup body. The top surface of the annular protruding rib is flush with the back surface of the cup body and the inner surface of cup cover 3 is in direct contact with the annular protruding rib. By pressing the connection part between hook 5 and cup cover 3, the cup cover is directly pressed against the annular protruding rib, causing the deformation of cup body 2, so that the air between the cup body and supporting surface 10 is discharged, forming a vacuum cavity. After the pressing force is removed, the residual internal force of framework 1 and cup cover 3, urge cup body 2 to restore to its original natural state, but restoring tendency is limited due to enhanced airtightness between cup body 2 and supporting surface 10. Those interactions continuously keep the cup body to be pressed against the supporting surface. Annular protruding rib 12 can effectively transfer the pressing force so that the cup will be less likely to fall off from the supporting surface. On cup cover 3, deformation holes 37 are provided and distributed in a circular formation to provide space for elastic deformation of the cup cover when subject to an external pressing force; otherwise the cup cover would deform very little and may even break. In the preferred embodiment, the deformation holes are elongated openings in a radial orientation.

On framework 1, radial cuts distributed along its circumference are provided, truncating annular protruding rib 12, so that the rib comprises a number of bulges 13 in a circular formation, which receive the pressing force from the cup cover, deforming framework 1 via the radial cuts. In the preferred embodiment, cuts include short cuts 14 and long cuts 15. Among them, long cuts 15 extend from a position near the center of framework 1 to its edge, and an optimum distance between the starting position of long cuts 14 and the center of framework 1 is about 8-15 mm. Short cuts 14 have a length of ⅓-¾ of that of long cut 15, and the short and long cuts (14 and 15) are arranged alternately to form a number of Y-shaped forks 101, with the bulges 13 located at both opening ends of such Y-shaped fork 101. Alternate arrangement of short and long cuts of the invention can enhance the strength of each Y-shaped fork, increase deformability of the framework, and facilitate the secondary injection of the plastic. Therefore, no injection opening is necessary, which is thus provided. Besides, the Y-shaped forks perform a "grasping" action, similar to the fingers of a human palm, generating stronger adsorptive force when cup body adsorption surface is in contact with supporting surface, as well as stronger friction force, so that the suction cup is suitable to be used on uneven, coarse, dense, and airtight supporting surfaces.

In the preferred embodiment, the connection part between connecting rod 11 and framework 1 is provided with reinforcing bars 102 evenly distributed along the circumference.

Operating of the suction cup of the present invention: place the cup on supporting surface 10, so that the adsorption surface of cup body contacts the supporting surface. Then, press the connection element located between the hook and the cup cover, so that cup cover 3 presses the annular protruding rib on cup body 2, which transfers the force and causes simultaneous elastic deformation of cup cover 3 and framework 1. After removal of the externally applied pressing force, both framework and cup cover have a residual internal force urging restoration to their original natural states, but such tendency is limited because the external air cannot enter the vacuum cavity due to airtightness between the cup and the supporting surface. As a result of those interactions, cup body 2 is continuously pressed against supporting surface 10.

Operating principle of the invention: the cup with a bowl-shaped framework undergoes an overall deformation under an externally applied pressing force, discharging the air between the cup and the supporting surface, generating negative pressure and forming a vacuum cavity. After the force is removed, the residual internal force of both the bowl-shaped framework and the cup cover urges them to restore to their original natural state. However, such restoration tendency is limited due to the airtightness between the cup and the supporting surface so that the external air cannot enter the vacuum cavity. Therefore, the restoration tendency and the airtightness work together to ensure the cup kept continuously firmly pressed against the supporting surface. In other words, the cup with bowl-shaped framework of the present invention transfers the force by an elastic deformation of the cup cover.

The suction cup of the invention can be used for hanging articles on smooth, coarse, dense, or airtight wall via a hook or basket.

Embodiment 2

Figure 4:
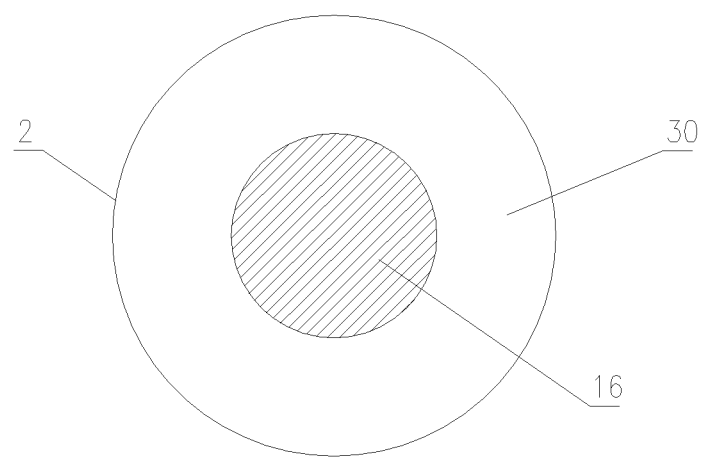
FIG. 4 is a bottom view of the adsorption surface of cup body of embodiment 2.

As shown in FIG. 4, the difference between this embodiment and embodiment 1 is described below: On the adsorption surface of cup body 2, installation grooves are provided for accommodating the seals, which extend out of the opening of the grooves to form a contact friction surface 30 between the seals and the edge of the cup body. In the embodiment, sealing gaskets 16 made of a PU material are used as seals. The cup body 2 and the sealing gaskets are integrally made. The bonding affinity of sealing gaskets 16 is higher than that of cup body 2, so that the gaskets are more easily attached to the supporting surface, enhancing the sealing effect. In addition, the bonding between the sealing gaskets and the cup body is good, and they are not prone to separation.

Embodiment 3

Figure 5:
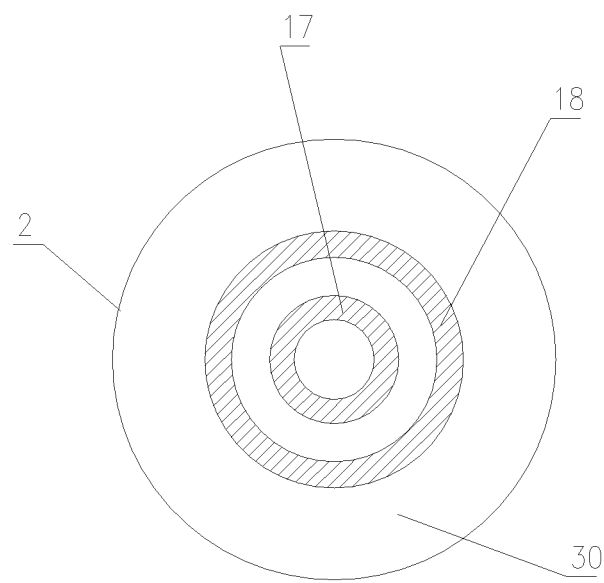
FIG. 5 is a bottom view of the adsorption surface of cup body of embodiment 3.

As shown in FIG. 5, the difference between this embodiment and embodiment 2 is described below: Two seal rings 17 and 18 of different diameters are used as the seals. The installation grooves are two annular grooves corresponding to the two seal rings, enclosing the center of the adsorption surface of cup body 2. The larger seal ring 18 and the edge of cup body 2 form a contact friction surface 30.

Embodiment 4

Figure 6:
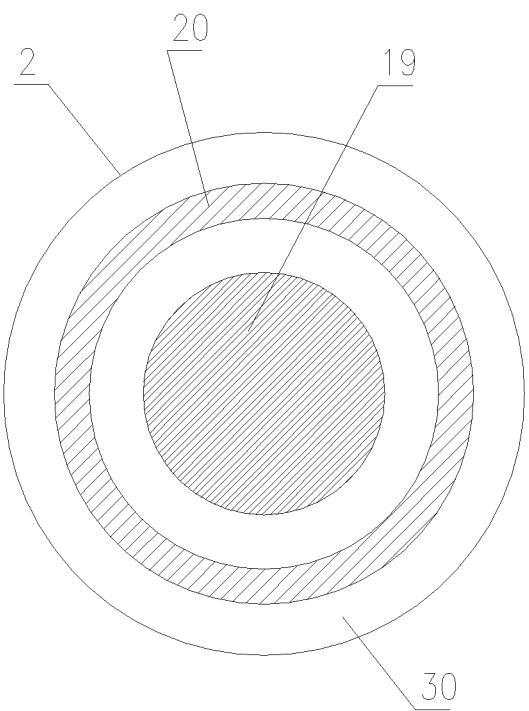
FIG. 6 is a bottom view of the adsorption surface of cup body of embodiment 4.

As shown in FIG. 6, the difference between this embodiment and embodiment 2 is described below: One sealing gasket 19 and one seal ring 20 are used as the seals. The sealing gasket 19 is located at the center of cup body 2's adsorption surface. One annular groove is provided for the installation of the seal ring. Seal ring 20 encloses sealing gasket 19. The seal ring 20 and the edge of cup body 2 form a contact friction surface 30.

Embodiment 5

Figure 7:
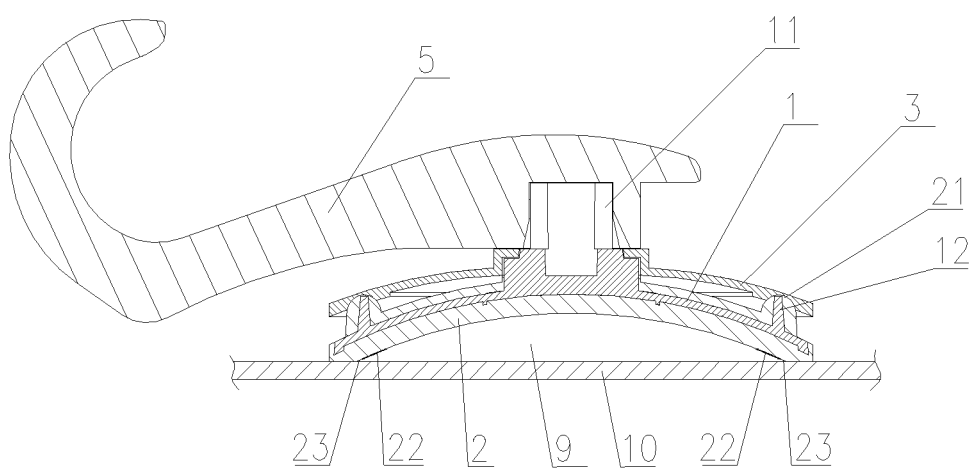
FIG. 7 is an overall section view of embodiment 5 of the invention.
Figure 8:
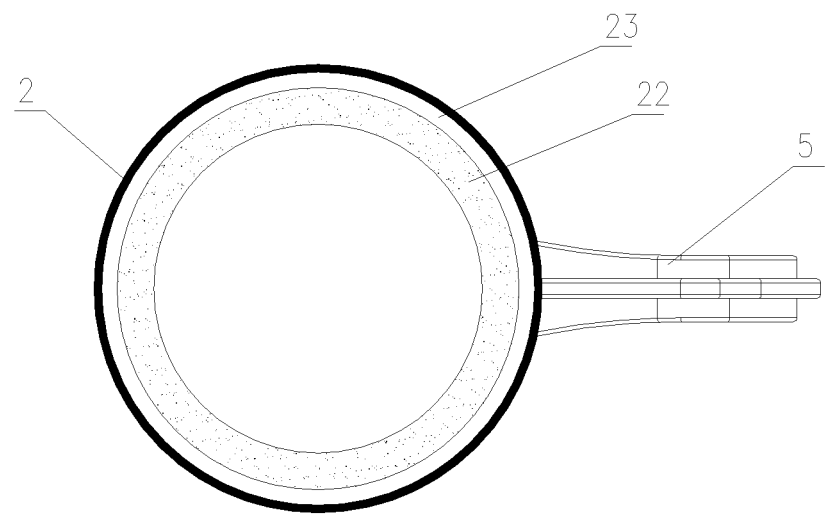
FIG. 8 is a bottom view of embodiment 5.

As shown in FIG. 7 and FIG. 8, the difference between the embodiment and embodiment 1 is described below: On the back surface of cup body 2, a protruding ring 21 is provided for wrapping around annular protruding rib 12. Due to the protection by protruding ring 21, when protruding rib 12 is pressed by cup cover 3, it will not easily break or be otherwise damaged, ad can continuously and effectively transfer the pressing force. Near the edge of cup body 2's adsorption surface, annular coarse area 22 is provided on the surface, with a smooth area 23 provided between the annular coarse area 22 and the edge of the adsorption surface, to effectively prevent entry of air and maintain the vacuum between the cup body adsorption's surface and the supporting surface. The annular coarse area 22 and the protruding ring 21 are located corresponding to each other. In this embodiment, the annular coarse area 22 is a fully enclosed annular surface, with eroded veins. It can increase the friction force between the adsorption surface and the supporting surface, thus further increasing adsorptive force of the cup and preventing its fall-off.

Embodiment 6

Figure 9:
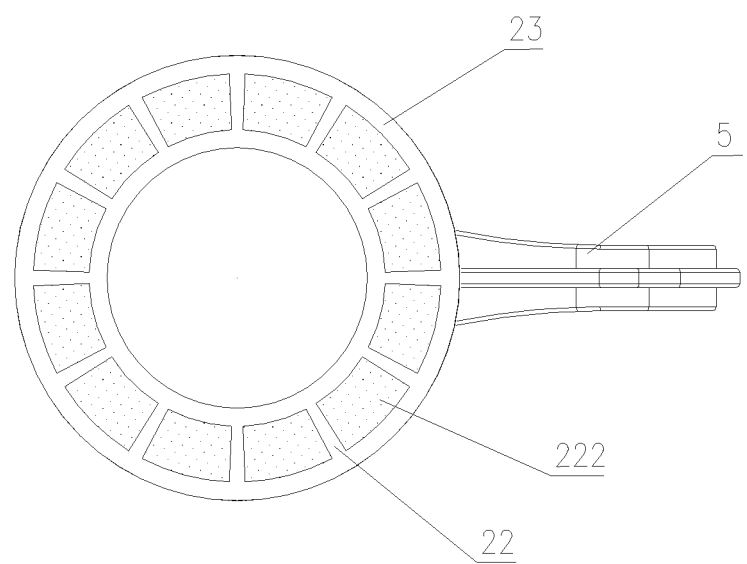
FIG. 9 is a bottom view of embodiment 6.

As shown in FIG. 9, the difference between this embodiment and embodiment 5 is described below: Annular coarse area 22 consists of a number coarse strips 222 arranged in a circular formation, the surface of these coarse strips is in a form of net veins. Coarse strips 222 are arranged at intervals, with a smooth area provided between two adjacent coarse strips 222.

Embodiment 7

Figure 10:
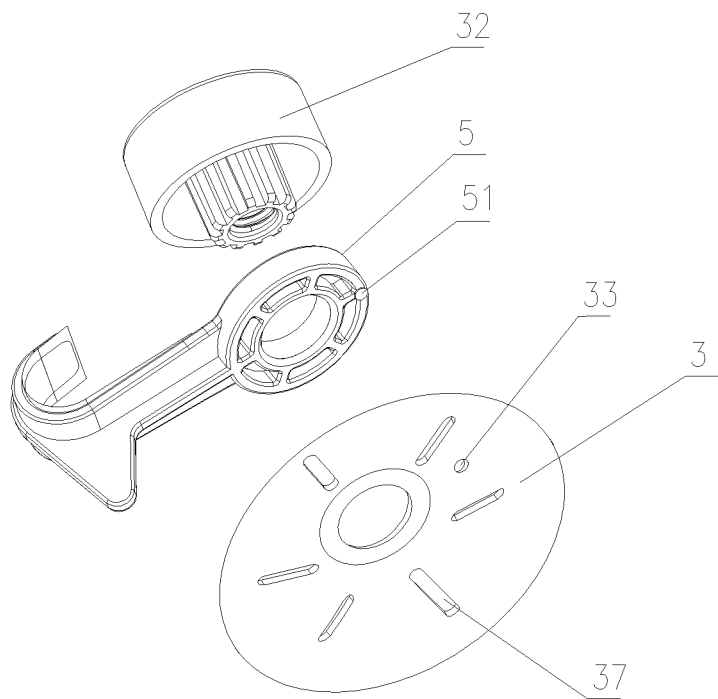
FIG. 10 is a structural exploded view of the nut sleeve, hook and cup cover of embodiment 7.
Figure 11:
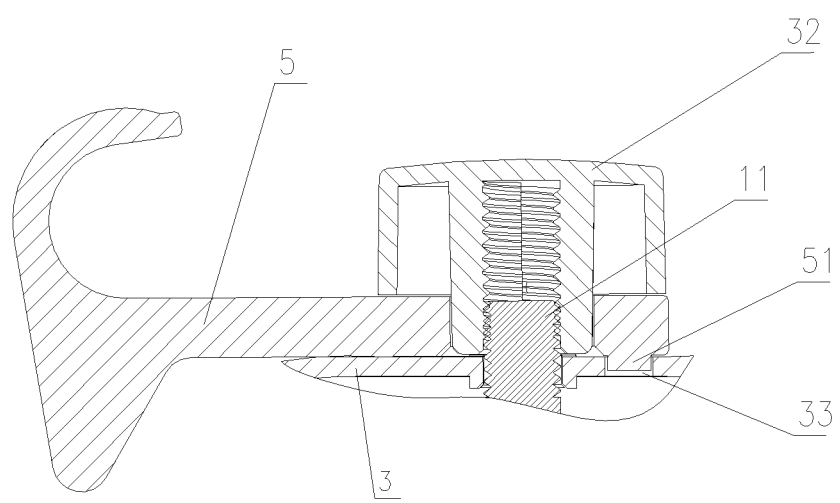
FIG. 11 is a partial section view of embodiment 7.

As shown in FIG. 10 and FIG. 11, the difference between this embodiment and embodiment 1 is described below: On the back surface of cup cover 3, a pressing element is provided, which is nut sleeve 32, and a screw 11 (not shown in these figures) is used as the connecting rod. Hook 5 is disposed on the screw in a location between the back surface of cup cover 3 and nut sleeve 32. After the cup body is placed onto the supporting surface, nut sleeve 32 can be rotated down to pull up the screw and hence the adsorption surface of cup body 2, to increase the degree of vacuum in the vacuum cavity. On the back surface of cup cover 3, a locating hole 33 is provided, and a corresponding locating column 51 is provided on hook 5. The locating column is inserted in the locating hole to fix hook 5 on cup cover 3.

Embodiment 8

Figure 12:
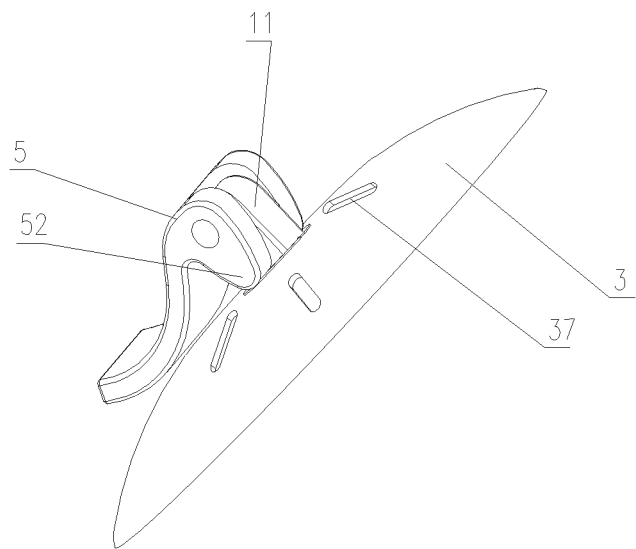
FIG. 12 is a schematic showing the hinging connection between the hook and connecting rod of embodiment 8.

As shown in FIG. 12, the difference between this embodiment and embodiment 1 is described below: Hook 5 is hinged to connecting rod 11. The connection end of hook 5 of a cam shape. By pressing the connection end's cam protruding part 52 on the back surface of cup cover 3, it pulls up connecting rod 11 and hence the cup body's adsorption surface, thereby increasing the degree of vacuum in the vacuum cavity.

Embodiment 9

Figure 13:
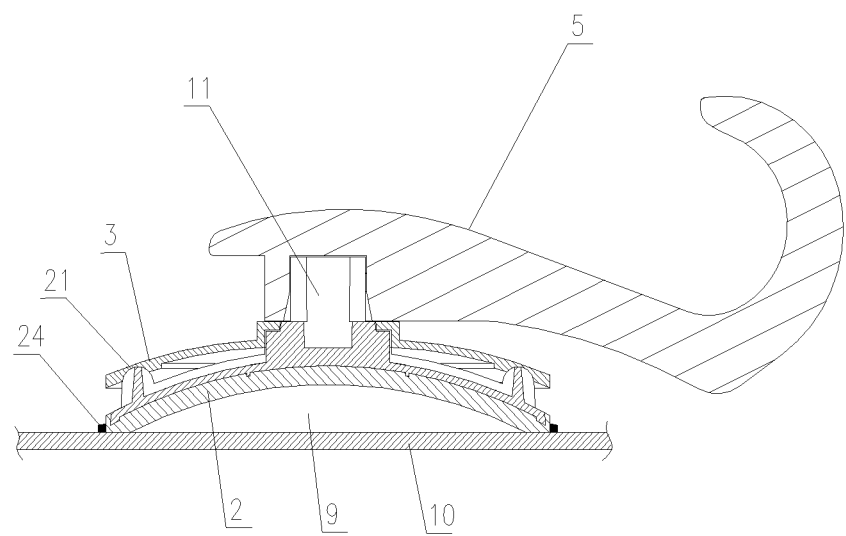
FIG. 13 is a section view of preferred embodiment 9 of the invention.

As shown in FIG. 13, the difference between this embodiment and embodiment 1 is described below: On circumferential edge of cup body 2, lip rims 24 extending outward are provided and they have the form of a thin sheet. This can further ensure airtightness of the vacuum cavity between the cup body and the supporting surface, and increase the size of the contact area as well as the adsorptive force.

In other preferred embodiments, injection holes may be provided on the framework to facilitate its manufacture by molding injection of plastic materials, to ensure running of the plastic materials during the secondary injection in forming the cup body and wrapping the framework. Seals may also be directly disposed on the adsorption surface of the cup body and extend out of the surface. In case the seal rings are used as the seals, a number of seal rings of different sizes may be used and arranged concentrically positioned, enclosing center of the cup body's adsorption surface. The annular coarse area can also have other structures and the coarse surface can be in other forms of veins. The deformation holes may also be in the form of long arc openings along the circumference. The length of short cuts is 1/3-3/4 of that of the long cuts. The more there is the Y-shaped forks, the weaker the overall framework is. However, if fewer Y-shaped forks are used, it will adversely affect adsorptive force of the cup. Therefore, the particular number of Y-shaped forks to be used shall be determined according to the actual application situation.

Embodiments of the present invention are not limited to the above. According to above disclosure of the invention and ordinary technical knowledge in the art, many other forms of modification, replacement, or variation of the invention can be made without departing from the basic technical concept of the invention, and shall be within the protection scope of the invention.

What is claimed is:

1. A suction cup, comprising a bowl-shaped framework with a back surface having a peripheral, a cup body having a back surface and covering said bowl-shaped framework, a connecting rod disposed on the back surface of said framework and passing through said cup body, a bowl-shaped cup cover having an inner surface and covering said connecting rod and the back surface of said cup body, and a hooking device disposed on the back surface of said cup cover and connected to said connecting rod, characterized in that an annular rib is provided on the peripheral of the back surface of said framework, and the inner surface of said cup cover is in contact with said annular rib.

2. The suction cup according to claim 1, wherein a protruding ring is provided on the back surface of said cup body, corresponding to a location where said annular rib is positioned, the inner surface of said cup cover press against said annular rib via said protruding ring; and a plurality of distortion holes positioned in a circle in a central location of said cup cover, providing space for elastic distortion of said cup cover when pressed under an external force.

3. The suction cup according to claim 1, wherein a plurality of through holes are provided on the back surface of said cup body by which said annular rib is exposed on the back surface of said cup body so that the inner surface of said cup cover is in direct contact with said annular rib; a plurality of radial-orientated cuts are provided in the peripheral of said framework, which truncate the said annular protruding rib so that the rib is now consisting of a plurality of bulges positioned in a circle and said bulges receive the pressure from said cup cover and deform said framework via said radial-orientated cuts.

4. The suction cup according to claim 3, wherein said radial-orientated cuts includes long cuts and short cuts, said long cuts extend from a position near the center of said framework to its edge, and said short cuts have a length of 1/3-3/4 of that of said long cuts, and the short and long cuts are arranged alternately to form a plurality of Y-shaped forks, with a bulge located at both opening ends of said Y-shaped fork.

5. The suction cup according to claim 4, wherein one or more seals are provided on an adsorption surface of said cup body; said seals protruding from said adsorption and forming a friction surface with the peripheral of said cup body.

6. The suction cup according to claim 5, wherein said seals have a high adsorption affinity than said cup body.

7. The suction cup according to claim 6, characterized in that said cup body and seals are formed integrally.

8. The suction cup according to claim 6, wherein a groove is provided on the adsorption surface of said cup body to accommodate each of said seals; said seal protruding out of the opening of said groove.

9. The suction cup according to claim 8, wherein said seals are one or more sealing gaskets or sealing rings of different diameters concentrically installed in corresponding grooves with the largest seal rings forming a friction surface with the peripheral of said cup body.

10. The suction cup according to claim 8, wherein said seals are one sealing gasket and at least one sealing rings; said sealing gasket being disposed at the center of the adsorption surface of said cup body and said sealing rings being concentrically each installed in a corresponding groove and enclosing said sealing gasket.

11. The suction cup according to claim 9, wherein an annular coarse area is provided on the peripheral of the adsorption surface of said cup body, said annular coarse area corresponding to the location of said protruding ring, and a smooth area is provided between said annular coarse area and the rim of the adsorption surface of said cup body.

12. The suction cup according to claim 11, wherein said annular coarse area is fully enclosed.

13. The suction cup according to claim 11, wherein said annular coarse area consists of a number of coarse strips arranged in a circle; said coarse strips being arranged at intervals, with a smooth area provided between two adjacent coarse strips.

14. The suction cup according to claim 13, wherein said coarse strips has a coarse surface consisting of eroded veins or net veins.

15. The suction cup according to claim 14, wherein a plurality of enforcement bars are provided along the circle where said connecting rod connects to said framework.

16. The suction cup according to claim 15, wherein a pressing element is provided on the back surface of said cup cover, said pressing element being a nut sleeve, said connecting rod being a screw rod, said hooking device disposed around said screw rod in a location between the back surface of said cup cover and said nut sleeve; where said nut sleeve is for pulling said screw rod and the adsorption surface of said cup body to increase a vacuum in a vacuum cavity.

17. The suction cup according to claim 16, wherein a locating hole is provided on the back surface of said cup cover and a corresponding locating column is provided on said hooking device, wherein said locating column is inserted in said locating hole to fix said hook device on said cup cover.

18. The suction cup according to claim 15, wherein said hooking device has a cam-shaped connection end, wherein a protruding part of the connection end is pressing on the back surface of said cup cover, which pulls up said connecting rod as well as said cup body's adsorption surface, thereby increasing a degree of vacuum in a vacuum cavity.

19. The suction cup according to claim 15, wherein said hooking device is a hook connected to said connecting rod by a buckle.

20. The suction cup according to claim 19, wherein a lip rim is provided which extends from the rim of said cup body and is in a form of thin sheet.

* * * * *